United States Patent [19]
Ryan et al.

[11] 4,301,138
[45] Nov. 17, 1981

[54] SYSTEM FOR TRANSPORTING PARTICULATE SOLIDS FROM HIGH TEMPERATURE TO LOW TEMPERATURE ZONE

[75] Inventors: Kenneth W. Ryan; Elmer H. Rogers, Jr., both of Palestine, Tex.

[73] Assignee: Aluminum Company of America, Pittsburgh, Pa.

[21] Appl. No.: 143,172

[22] Filed: Apr. 24, 1980

[51] Int. Cl.$^3$ .......................... C01F 3/60; F27B 15/08
[52] U.S. Cl. ........................... 423/495; 423/DIG. 16; 422/145; 34/10
[58] Field of Search ............................. 423/495–497, 423/DIG. 16; 422/145; 34/10

[56] References Cited

U.S. PATENT DOCUMENTS 2,726,136 12/1955 Davis ................................... 422/145
3,758,675 9/1973 Piccolo ...................... 423/DIG. 16
3,842,163 10/1974 Russel et al. ......................... 423/496

FOREIGN PATENT DOCUMENTS 2800268 2/1978 Fed. Rep. of Germany ... 423/DIG. 16
880792 10/1961 United Kingdom ....... 423/DIG. 16

*Primary Examiner*—G. O. Peters
*Attorney, Agent, or Firm*—Carl R. Lippert

[57] ABSTRACT

Fluidizable particulate solids are removed from a first zone operating at a relatively higher temperature and pressure to a second zone or collector operating or maintained at a lower temperature and pressure by an improved drain or particle removal system. The improved system includes moving the particles from the first zone downwardly within a substantially vertical inlet conduit or leg into the lower regions of a first chamber and upwardly through that chamber under fluidized particle transport conditions energized by a fluidizing media provided in the chamber. The particles move to a second chamber by overflowing a weir separating the first and second chambers and are mixed with cooler particles which extract heat within the second chamber under fluidized particle transport conditions energized by a second fluidizing gas source which further transports the particles to the collector or second zone. Heat is removed from the second chamber by indirect heat exchange. The volume of fluidizing gas for the second chamber is much larger than that for the first chamber and provides for particle flow rate control in combination with a flow restriction. Particle flow is interrupted by stopping the particle flow out of, and the gas flow into, the second chamber while maintaining fluidizing gas flow into the first chamber and the inlet leg. The system is particularly suited to draining unreacted alumina from a chlorination reactor for producing gaseous aluminum chloride from particulate alumina.

31 Claims, 1 Drawing Figure

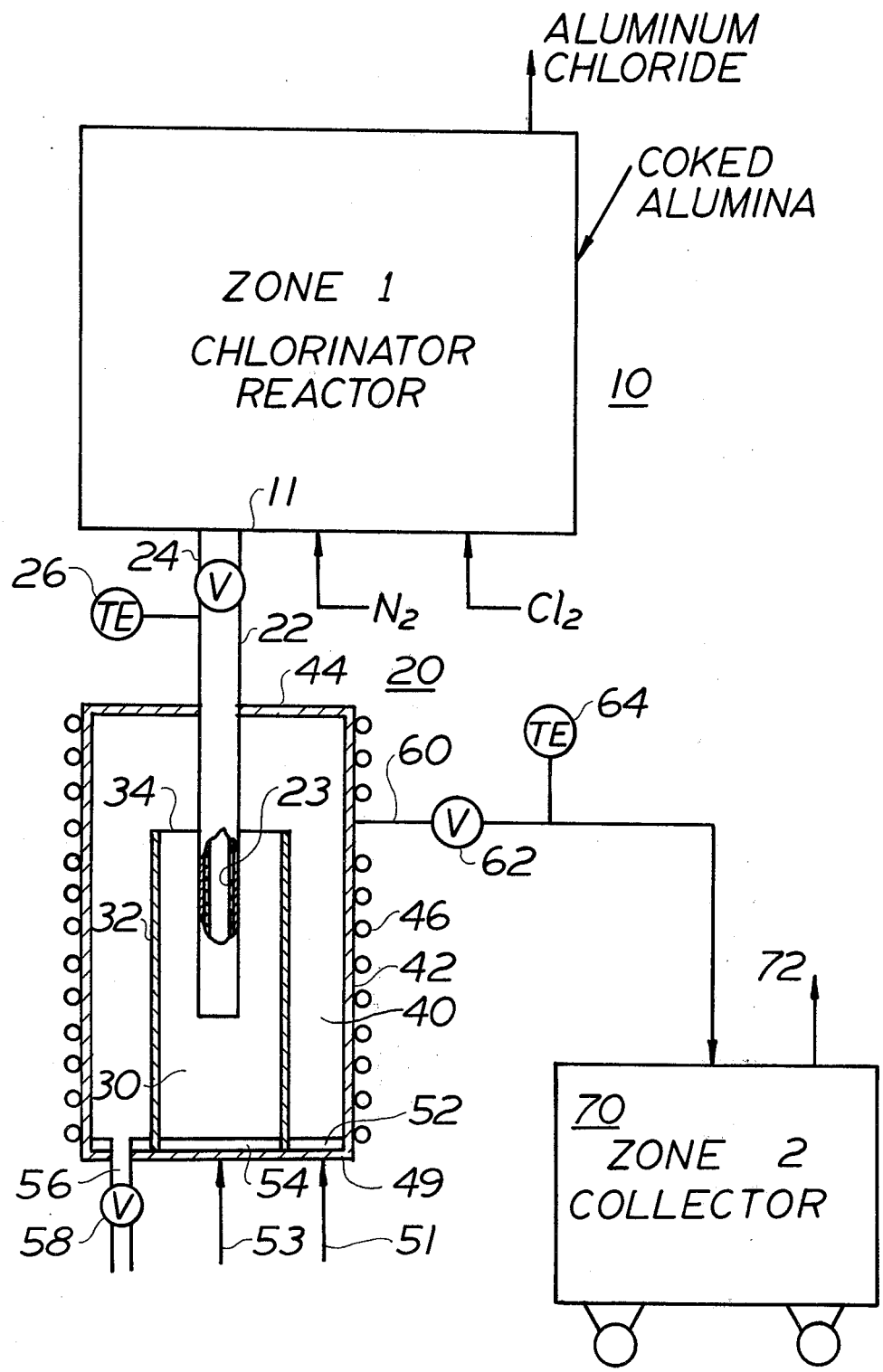

SYSTEM FOR TRANSPORTING PARTICULATE SOLIDS FROM HIGH TEMPERATURE TO LOW TEMPERATURE ZONE

BACKGROUND

This invention relates to a system and a process for removing fluidizable solid particulate material from a first zone or vessel, such as a reactor, operating at an elevated temperature and pressure and delivering such solids to a second zone at a reduced temperature and pressure.

There are various systems or processes wherein a reactant in fluidizable solid particulate form is suspended in a reactor by a fluidizing gas. The fluidizing gas can be reactive to the suspended particles and the reaction product removed as a volatile material. Where such processes operate at elevated temperatures such as 500° C. or 600° C. and at some positive pressure, a problem presents itself in removing the unreacted particulate matter from the reactor. One example occurs in the chlorination of alumina to provide aluminum chloride. Such a process is shown in U.S. Pat. No. 3,842,163 wherein a system is shown for reacting fluidized coked alumina particles with chlorine to produce aluminum chloride useful in the production of aluminum. As indicated in U.S. Pat. No. 3,842,163, incorporated herein by reference, the desired character of alumina is the porous condition (such as gamma phase) which is reactive with chlorine as opposed to the low surface area condition (commonly designated the alpha phase) which is relatively unreactive with chlorine in that process. However, it is difficult to avoid at least some alpha alumina in the coked alumina charge, for instance 0.1 to 4.5%, and this alpha alumina is not consumed by reaction, but rather accumulates in the reactor to deplete its reaction zone volume and impede operation in the process according to U.S. Pat. No. 3,842,163. It is the unreacted alpha alumina which needs to be drained or removed to restore the depleted reactor volume. However, draining alpha alumina at 600° to 800° C. presents certain materials handling and safety problems. Accordingly, one practice utilized has been to shut down the chlorinator for sufficient time to facilitate removal of the alpha alumina accumulation after which the chlorinator would be restarted. However, this is an obvious interruption in production which is desirably avoided since the interruption could consume a full day in a large size operation where the reactor could be between 10 and 20 feet in diameter. Fluidized solids handling techniques employing seal pots have also been tried, but the success of such has been limited by practical problems and safety considerations.

Accordingly, it is an object of the present invention to provide a process and system and for removing particles from a reactor, such as a reactor for chlorinating fluidized alumina to provide aluminum chloride, with a minimum interruption in the reaction and with a minimum of safety problems.

Another object is to provide such a system and process employing fluidized particle handling techniques to remove the solids particles from the reactor and discharge the same at reduced temperature and pressure.

DETAILED DESCRIPTION

FIG. 1 is a schematic elevation in partial cross section illustrating the operation of the improved system and process.

Referring to FIG. 1, a particulate charge is reacted in the presence of a fluidizing medium such as a fluidizing gas within reactor 10. In the particular reactor depicted, the reactor functions as a chlorinator wherein coked alumina charge in particulate form is reacted with fluidizing chlorine gas to produce aluminum chloride according to the disclosure of U.S. Pat. No. 3,842,163. The reactor 10 is connected to the improved solids drain system 20 by an elongate inlet leg 22 including an isolation valve 24 and a temperature sensing element 26. Within the improved solids draining system 20, the inlet leg runs or extends downwardly within a first chamber 30 bounded by wall or weir 32, the inlet leg extending down toward the bottom regions of the first chamber 30. The weir or chamber wall 32 is open at its top end 34. Outside the first chamber 30 is a second chamber 40 which is bound by outside wall 42 and is closed against the inlet leg by cover 44. Around the outside of chamber 40 cooling coils 46 are provided which can be copper tubing in close contact with outside wall 42. The bottom of the improved drain system 20 is sealed by bottom plate 49 to provide a pressure tight compartment in cooperation with outer wall 42 and cover 44. A gas inlet 51 is provided to supply fluidizing gas through distributor 52 to the second chamber 40. Likewise, a fluidizing gas supply 53 is connected through distributor 54 to the first chamber 30. A bottom drain line 56 is connected to the second chamber 40 and equipped with a valve 58 to facilitate removal of samples if such is desired. Connected to the upper regions of the second chamber 40 is a transport line 60 provided with a valve 62 and a temperature sensing element 64. The transport line 60 runs to a collection system 70 equipped with a vent 72. Because of temperature and the possible presence of corrosive gases, the inlet leg 22, chamber walls 32 and 42, top cover 44, bottom cover 49, transport line 60 and any valving therein should be provided in a corrosion-resistant material such as nickel-chromium alloy (Ni-Cr) available under the trade name Inconel or such other corrosion-resistant material depending on the particular substances being handled. In the case of draining alumina from the chlorinator 10, Ni-Cr is preferred although the inlet leg 22 preferably includes a lining 23 of a refractory material such as silicon carbide.

In operation, the particulate solids matter exits the reactor 10 and moves downwardly within inlet leg 22 into the lower region or bottom region of the first chamber 30. The particles are fluidized in chamber 30 and travel upwardly within the first chamber 30 and flow over the top 34 of chamber wall 32 into the second chamber 40 where the particles are fluidized and are mixed with other particles which had previously exited the first chamber 30 and moved to the second chamber 40. These previously exited particles are cooler because of the time spent in the second chamber 40 and when mixed with particles subsequently entering the second chamber extract heat from the subsequently entering particles. The particles then exit the second chamber 40 through the transport line 50 into a collection system 70. The transporting and other gases accompanying the particulate matter traveling through transport line 60 into collection system 70 are vented through vent 72. Where that gas is toxic or objectionable from an environmental standpoint (for instance, a gas such as chlorine), the gas can be further routed to a fugitive gas processing or disposal system. The mode of transportation for the particulate solids throughout the system is by fluidizing and carrier gas means. In normal operation chamber 30 is filled with particles and the same applies to the second chamber 40, at least up to or slightly above transport line 60. Inlet leg 22 is also typically full substantially up to reactor 10. Thus, the particulate solids within the reactor 10 being drained travel to the drain site 11 and into inlet leg 22 by the action of fluidizing gas or gas transport means. Particle fluidization is maintained within the first chamber 30 by fluidizing gas entering the bottom portion of chamber 30 through line 53. In the second or outer chamber 40, particle fluidization is maintained by fluidizing gas entering through line 51. Since the system is sealed, fluidizing gas from both the first and second chambers, 30 and 40, serves as carrier gas to transport the particles through the transport line 60. As generally shown in FIG. 1, the transport line 60 can be positioned approximately at the same elevation as the upper end 34 for wall or weir 32 separating the first and second chambers, 30 and 40, although the line may be positioned above or below, for instance, a few or several inches above or below the upper edge 34.

As the particles are moved through the second chamber 40, they are cooled substantially as a result of cooling coils 46 through which a cooling medium such as water can be circulated. Thus, while some cooling is effected by direct contact with the fluidizing gas within both the first chamber 30 and second chamber 40, highly substantial amounts of heat are removed from the drain system 20 by indirect heat transfer, especially within the second chamber 40, although obviously some heat will pass from the first chamber 30 to the cooler second chamber 40 through wall 32 separating the chambers. In practicing the invention the already mentioned mixing in the second chamber 40 of particles exiting the first chamber 30 with cooler particles plays an important role in extracting heat from the warmer particles. The cooler particles are particles which previously entered and were cooled within the second chamber 40. Thus in the second chamber 40 there are both a supply of hotter particles from chamber 30 and a removal of cooler particles via transport line 60, with the warmer particles being cooled largely by the cooler particles prior to exiting chamber 40. This mixing action substantially improves heat extraction in the improved system. Thus the major mode of ultimate heat removal from the improved system 20 is by indirect heat exchange through the outer wall of second chamber 40. However, the major cooling effect as seen by an individual particle entering chamber 40 is by direct contact heat exchange with cooler particles, the cooler particles having been previously cooled within chamber 40. This system facilitates high heat removal rates while avoiding complicated or expensive arrangements. For instance, particles entering the system 20 at temperatures of 600° to 800° C. or more can be cooled to temperatures of 300° C. and less as they are transported to collector 70.

The temperature sensing element 26 in the inlet leg 22 and the temperature element 64 in the drain transport line 60 are provided largely for safety reasons. If the drain system should clog or malfunction, a temperature rise would probably occur. Each of the temperature sensors 26 and 64 can be connected to a high temperature alarm switch which shuts down the drain system 20 by shutting off drain valve 62 and the supply of fluidizing gas to the outer chamber 40 as explained hereinbelow.

From a pressure standpoint, the sealed drain system 20 needs to withstand substantially the same pressure as prevailing in the reactor 10 and is accordingly designed to be pressure tight. The drain system 20 operates at substantially the same pressure or slightly less pressure than the pressure in the reactor. A pressure difference of about 5 psi in favor of the reactor 10 over the drain system 20 is suitable especially at high solids flow rates. When the particulate matter is transported from a first zone, reactor 10, at a first pressure and temperature such as 600° C. and 15 psig pressure, to a second zone, collector 70, at a lower temperature and pressure, for instance 200° or 300° C. and substantially atmospheric pressure, the cooling effect is accomplished largely by the heat transfer effects occurring mostly in the second chamber 40, and the pressure drop is effected mainly by transport line 60 which can be selected to be of small size or which can be a larger size with an orifice or constriction provided therein to supply the desired pressure drop. However, a transport line of substantially constant cross section, such as a pipe, is preferred as less likely to plug.

Operation of the improved drain system 20 is favored when the difference in pressure between the first (higher pressure) zone, reactor 10, and the second (lower pressure) zone, collector 70, is at least 5 psi and preferably at least 10 psi, for instance a pressure difference of 10 to 50 psi. The improved drain system is particularly useful in transporting particles from a first zone at about 5 to 35 psig to a second zone at substantially atmospheric pressure. However, higher or lower pressures in either the first zone 10 or the second zone 70 should also be acceptable.

The temperature in the first zone is typically that normally prevailing in reactor 10 and can vary from a moderate level of 100° to 300° C. up to higher (and more dangerous) levels of 400° to 800° C. and even more, up to 1000° C. or more. The temperature in the second zone is that desired for the intended purpose, but is lower than the temperature in the first zone, typically by at least 50° to 200° C. or 300° C. or more. In the case of collector 70, a desired temperature might be 200° to 300° C. but could be higher or lower depending on the desired conditions there. The improved drain system can readily reduce temperatures by 200° to 400° C. and even more, for instance up to 600° C. or more, and this offers many advantages. For instance, handling solids particles at atmospheric pressure and a temperature of 200° C. has obvious advantages over handling them at 2 atmospheres pressure and 600° C.

In practicing the present invention, it is important that the fluidizing gas rates and volumes provided to the inner chamber 30 and outer chamber 40 be carefully controlled to assure proper operation. The amount of fluidizing gas provided to chamber 40 should be substantially higher than that provided to the inner chamber 30, such that the volume of gas provided to the second chamber 40 is at least five times that provided to the inner or first chamber 30 and preferably at least seven or eight times as high, more preferably at least ten times as high. This assures that the fluidizing gas in chamber 40 eclipses the fluidizing gas from the first chamber 30 in establishing the pressure drop across the transport line 60. Examples of comparative flow rates suitable in practicing the invention are 1 to 20 standard cubic feet per hour (SCFH) for fluidizing gas for the first chamber 30 and about 300 to 500 SCFH for the fluidizing gas in the second chamber 40 which results in relative overall gas rates of 15:1, 20:1 or even 30:1 or 40:1 and even much higher such as 100:1 in favor of the second chamber over the first chamber. To some extent this can be accomplished by providing a larger cross-sectional area transverse to fluidizing gas flow in the second chamber 40 than in the first chamber 30, but this in itself is not sufficient in that specific fluidizing gas flow rates in terms of cubic feet per hour per transverse unit area are still considerably higher in the second chamber 40 than in the first chamber 30. For instance, a specific fluidizing flow rate in the second chamber 40 might be 3½ to 7 or 8 standard cubic feet per hour per square inch of bed cross section whereas the rate in the first chamber 30 would be only 0.1 to 2 or 3 SCFH per square inch of bed cross section, and the ratio in terms of gas flow per unit area would range from in excess of 1 or 1½ or 2 up to 40:1 or more in favor of the second chamber 40 over the first chamber 30 with ratios of about 3 to 30:1 being typical and 15 to 30:1 being preferred.

In a general sense increasing the gas flow rate in the first chamber 30 could be viewed as favoring higher solids removal rates. However, as just pointed out, the much higher overall fluidizing gas rate in the second chamber 40 eclipses the effect of the gas in the first chamber 30, and the result is a reverse in the relationship between the gas flow rate and the solids handling rate in that higher gas rates flowing through the transport line 60 tend to increase the pressure drop and this in turn reduces the solids handling rate. Thus, if it is desired to increase the solids particles handling rate, the amount of gas being introduced through line 51 into the second chamber 40 is diminished whereas increasing that gas flow rate decreases the particle flow rate. Accordingly the invention includes controlling the rate of solids discharge by increasing said gas flow to reduce solids rate and by decreasing said gas flow to increase solids rate.

It is desired that the second chamber 40 be larger than the first chamber in area transverse to the main fluidizing gas flow direction, that is, have more area in the horizontal plane as viewed in FIG. 1. This helps increase the cooling effect in the second chamber 40, both by providing larger heat exchange surfaces and volumes and by providing sufficient particle residence time in chamber 40 to facilitate the desired mixing and cooling effects discussed earlier. Also, a larger cross sectional area in chamber 40 helps assure achieving the desired higher overall fluidizing gas volume rates within the second chamber 40 without reaching such high gas rates per unit cross sectional area as to impede the desired particle means residence time in the second chamber. Blowing the particles through chamber 40 too quickly could seriously impede the desired cooling effect thereby preventing sufficient residence time for particle cooling to occur and by preventing proximity among the particles moving through chamber 40 sufficient for good heat transfer. Thus, it is desired that the horizontal cross-sectional area for chamber 40 (the area between wall 42 and wall 32 in a horizontal plane) be at least 2 or 3 times, preferably at least 4 times, the cross-sectional area for chamber 30 (the area within wall 32 in a horizontal plane).

It is also desired that the distance separating the bottom of inlet leg 22 from the bottom of chamber 30 be larger than the cross-sectional size of th inlet leg 22. Typically it may be 1½ or 2 times or more times the cross-sectional size of the inlet leg 22. For instance, if the inlet leg is a 2 inch pipe the distance between its bottom and the bottom of chamer 30 could be 4 inches.

Another important feature in practicing the invention occurs in connection with interruptions in the flow of particulate solids through the drain system 20. While the system is capable of operating continuously, some amount of interruption for one reason or another can be difficult to avoid. Moreover, it has been found in practicing the invention that it is preferred to operate the drain system 20 on an intermittent basis. That is, some amount of particulate solids is permitted to build up in the reactor for a short time after which it is then drained by actuation of the drainage system 20 which is then interrupted for another period of build-up within the reactor. This has advantages in overall economics and safety both in the reactor 10 and in the drain system 20 and can reduce the likelihood of plugging by operating at higher velocity through transport line 60.

It is important in practicing the invention that when the drainage operation is interrupted, valve 24 in inlet leg 20 remain open and that it be valve 62 which is closed. Also it is important that the fluidizing gas flow rate to line 51 into the second chamber 50 be significantly reduced or preferably interrupted but that the flow of fluidizing gas through line 53 into chamber 30 be maintained even during periods of interruption. Since valve 24 is open the fluidizing gas will simply maintain fluidity or fluidized conditions in the first chamber 30 and fluidize the particles in the inlet leg 22 with the fluidizing gas exhausting into the reactor. This prevents clogging which could otherwise occur in the inlet leg 22 if the valve 24 should be closed, or, even if it remains open, some amount of clogging can occur while inlet leg 22 is unfluidized which would create a serious risk in that it typically can require a high pressure purge or rodding to clear the line with the safety risks inherent in such operation. For reasons of ease of particle transfer and avoidance of clogging, it is important that the inlet leg 22 be provided as a substantially straight vertical path from the lower region of the reactor into the drainage system 20 with minimum obstructions to flow, and that vlave 24 be constructed to favor straight through and unimpeded flow when the valve is open. While normal interruptions are conducted without closing valve 24, the valve 24 might be closed if a major malfunction or complete or long duration shutdown should occur. As indicated above, the temperature elements 26 and 24 help provide some protection in the event of a malfunction which usually produces increasing temperature, and a high temperature switch could readily activate the closing of valve 62 in transport line 60 along with interrupting the fluidizing gas flow through line 51 in the chamber 40 and could even close valve 24 in the inlet leg if this is desired in a particular situation.

The fluidizing gas or gases introduced through lines 53 and 51 into the first chamber 30 and into the second chamber 40 may be the same or different, and either or both can be the same as that used in the reactor 10 or can be different depending on various factors such as cost, safety, operational and environmental considerations. The least expensive choice consistent with avoiding additional problems is typically a preferred choice. In many cases an inexpensive relatively inactive gas such as nitrogen or a gas mixture can be used. Operational considerations can include that the gas (at least that entering chamber 30) not be excessively detrimental to the operation of reactor 10 since some of that gas rises within inlet leg 22 and enters the reactor 10. Normally a dry or low moisture content in the gas favors operation both by minimizing clogging and by the fact that moisture can be detrimental should it enter reactor 10. This would apply where the reactor was a chlorinator of the type in U.S. Pat. No. 3,842,163. In such a case, dry relatively inactive gases such as nitrogen or carbon dioxide and inert gases such as argon are useful. By dry is meant having a dew point of less than 0° F. An inactive gas is considered to be a gas which is non-reactive and non-contaminating, both to the system and to the environment.

The transport line 60 can advantageously be provided as a small diameter opening having a cross sectional area normal to the gas flow much smaller than that of the second chamber 40 by a factor of at least 70:1 and preferably at least 100:1, and more preferably at least 140:1. The small opening is advantageously provided as an elongate conduit such as a pipe or tube or the like which can extend partially or entirely the distance from the second chamber 40 to the collector-second zone 70.

One preferred embodiment of the invention includes providing the transport line 60 as a double walled conduit. The high velocity particle flow rates, especially where the transport gas contains an active or corrosive chemical such as chlorine, can erode or corrode holes in the transport line 60. The double walled system permits particles to leak out the inside wall and fill the gap between the pipe walls, thus closing off the hole in the inner wall while maintaining the integrity of the confinement of the gas and particles within the inner pipe. For instance, an inner line could be provided as $\frac{1}{2}$ inch Ni-Cr pipe, and an outer jacket could be provided as 2-inch pipe. Any leaks from the $\frac{1}{2}$ inch Ni-Cr pipe could be quickly clogged within the space between the two pipes without sufficient loss of particles and with no escape of corrosive gases. While the transport line 60 is not necessarily straight and downwardly extending, it is preferred to keep bends or elbows in this line to the minimum consistent with practicality in order to minimize the erosion problems.

Another preferred embodiment of the invention, where the reactor (i.e. the first zone) contains an active or reactive gas such as chlorine, concerns providing a less active or inactive gas to the reactor at or near the site where the down leg into the drain system connects to the reactor. Thus, in FIG. 1 where chlorine gas is used to fluidize the particulate matter within reactor 10, a nitrogen stream is provided to fluidize the particulate alumina in the region of the site 11 where the drain down leg 22 connects to the reactor and assists in fluid particle transport of the alumina particles within the reactor 10 to the reactor drain site 11 for entry into the inlet leg 22 of the particle removal system 20. This tends to reduce the amount of chlorine or active gas entering the inlet leg 22 and particle removal system 20.

EXAMPLE

As an example of a suitable embodiment of the invention, inlet leg 22 is provided as a 2 inch Ni-Cr pipe extending vertically downwardly from the bottom regions of a chlorinator of the type depicted in U.S. Pat. No. 3,842,163. The inlet leg 22 includes a 1½ inch silicon carbide refractory liner pipe 23 of its inside to protect the inlet leg from the corrosion and temperature effects of alumina and chlorine at 600° C. The chamber wall 32 for the first chamber is provided as a 4 inch Ni-Cr pipe and the wall 42 for the second chamber 40 is provided as a 10 inch pipe. The overall length for the discharge system 20 extending from top plate 44 to bottom plate 49 is about three feet. In this system the transport line 60 is $\frac{1}{2}$ inch diameter pipe, which is of very much smaller cross section than the annular cross section of the second chamber 40 by a factor of about 160 or 165:1. The gas flow rate into the second chamber 40 is approximately 400 standard cubic feet per hour, and the fluidizing gas flow rate into the first chamber 30 is about 4 SCFH. Using this arrangement, solids flow rates of 200 to 1500 and even up to 2000 pounds per hour of alumina particles are readily achieved in draining particles of alumina from a chlorinator of the type in U.S. Pat. No. 3,842,163. The particles exited the fluidized chlorinator at 600° C. and 14 psig and arrived at the collector 70 at 300° C. and atmospheric pressure, thus facilitating safe and relatively easy handling of the particles. This relatively small size discharge system is readily capable of draining unreacted alumina solids particles from reactor vessels of substantial size, for instance ranging in diameter from 10 to 15 feet or, even more, up to 20 feet or still more in size, thus illustrating the efficiency of construction and operation achieved in practicing the invention. Not only does the improved system accomplish the draining, but does so in a relatively uncomplicated operation.

The overall arrangement depicted in FIG. 1 and as just described, wherein the inlet leg 22, the first chamber wall 32 and second chamber wall 42 are all provided as concentric pipes or right circular cylinders, is a preferred embodiment of the invention from the standpoint of space utilization and ease of construction. This arrangement assures the desired larger size for the second chamber 40 which tends to increase the rate of heat extraction by the cooling coils 46. Cooling coils 46 are shown as attached to the outer wall 42 of second chamber 40, and this is preferred from simplicity of construction and maintenance, although a cooling means could also be situated inside the second chamber 40 and even within the first chamber 30. However, as just stated, the arrangement shown in FIG. 1 should provide adequate cooling for most applications, and locating the cooling coils on the outside of wall 42 minimizes interferences within the chamber 40 and attendant maintenance problems.

While the improved system and process have been described with particular reference to draining unreacted alumina from a chlorinator of the type depicted in U.S. Pat. No. 3,842,163 used in reacting alumina with chlorine to produce aluminum chloride, the invention is believed to be useful in draining particles from other reactors or vessels as well. That is, the improved system and process should be useful on a broader scale in removing fluidized particles from a first fluidized zone operated at a relatively high temperature and pressure to a second zone which may or may not be fluidized but is operated at a substantially lower pressure or temperature. The particles could be unreacted feed stock or even a reaction product.

While the invention has been described in terms of preferred embodiments, the claims appended hereto are intended to encompass all embodiments which fall within the spirit of the invention.

What is claimed is:

1. A process of moving fluidizable particulate solids semi-continuously from a first zone of higher pressure and temperature to a second zone of lower pressure and temperature comprising the steps:
   (a) introducing said particulate solids into the upper portion of a downwardly extending substantially vertical inlet leg by fluidized particle transport;
   (b) moving said particulate solids downwardly within said inlet leg into the lower region of a first chamber separated from a second chamber by an overflow weir;
   (c) fluidizing said particulate solids within said first chamber by the action of a fluidizing gas introduced into the bottom portions of said first chamber and moving upwardly therethrough to move said fluidized particulate solids upwardly within said first chamber and overflow said weir to enter said second chamber;
   (d) fluidizing said particulate solids in said second chamber by the action of a fluidizing gas introduced into the bottom portions of said second chamber and moving upwardly therethrough, said particulate solids within said second chamber mixing with and transferring heat by direct contact heat exchange to particulate solids which previously entered said second chamber;
   (e) cooling said second chamber by indirect heat transfer means;
   (f) said first and second chambers being maintained at a pressure higher than that of said second zone;
   (g) maintaining said fluidizing gas in said second chamber at a higher overall gas volume flow ratio of at least 5:1;
   (h) moving said particulate solids from said second chamber to said second zone at said lower pressure and temperature, said particles being moved by said fluidizing gases through a flow restricting means, said movement being regulated by said flow restriction means in cooperation with said fluidizing gas flow;
   (i) interrupting the flow of said particulate matter into said first chamber by interrupting the flow thereof through said flow restriction means and substantially reducing the fluidizing gas flow into said second chamber while maintaining the fluidizing gas flow within said first chamber and into said inlet leg, said fluidizing gas passing upwardly into said first zone.

2. The process according to claim 1 wherein the rate of particulate solids movement through said flow restricting means is controlled by increasing flow of fluidizing gas to said second chamber to reduce particulate solids rate and decreasing said gas flow to increase said particulate solids rate.

3. The process according to claim 1 wherein the fluidizing gas introduced to said first chamber fluidizes particles within said inlet leg during said interruption.

4. The process according to claim 1 wherein the fluidizing gas introduced into at least one of said chambers is an inactive gas.

5. The process according to claim 1 wherein the overall fluidizing gas volume flow in said second chamber is at least ten times that in the first chamber.

6. The process according to claim 1 wherein the overall fluidizing gas volume flow in said second chamber is at least 20 times that in the first chamber.

7. The improved process according to claim 1 wherein the specific gas ratio flow per unit cross-sectional area in said second chamber is at least $1\frac{1}{2}$ times that in the first chamber.

8. The improved process according to claim 1 wherein the specific gas ratio flow per unit cross-sectional area in said second chamber is at least three times that in the first chamber.

9. The improved process according to claim 1 wherein said introduction of said particulate solids into said inlet leg is by fluidized particle transport.

10. The process according to claim 1 wherein said particulate solids matter is fluidized in said first zone and is transported within said first zone by fluidized particle transport to the site in said first zone for introduction into said inlet leg.

11. The process according to claim 1 wherein said first zone includes fluidization of particulate matter by an active gas and wherein said particulate solids matter being drained is moved to a site within said first zone for introduction into said inlet leg by fluidized particle transport utilizing an inactive gas introduced to said particles in the proximity of said site.

12. The process according to claim 1 wherein said first zone includes fluidized chlorination of coked alumina to consume most of said alumina to produce gaseous aluminum chloride and carbon oxides but which leaves some unreacted alpha alumina which comprises the particulate solids matter removed from said first zone.

13. The process according to claim 12 wherein additional fluidizing gas is introduced in said first zone in the proximity of the site of introduction to said inlet let to assist in particle transport in zone one to said introduction site and wherein said additional fluidizing gas is an inactive gas.

14. The process according to claim 1 wherein the temperature in said first zone is between 100° and 1000° C. and wherein the temperature in said second zone is at least 50° C. less than that in said first zone.

15. The process according to claim 1 wherein the temperature in said first zone is between 400° and 1000° C. and the temperature in the second zone is at least 200° C. less than that in said first zone.

16. The process according to claim 1 wherein the pressure in said first zone is at least five psi greater than that in said second zone.

17. The process according to claim 1 wherein the pressure in said first zone is between 10 and 50 psi greater than that in said second zone.

18. The process according to claim 1 wherein the cross-sectional area of said second chamber in a plane transverse to the primary direction of fluidizing gas travel is at least twice that of chamber one.

19. The process according to claim 18 wherein the said area of said second chamber is at least four times that of said first chamber.

20. The process according to claim 1 wherein said first and second chambers are substantially vertical.

21. The process according to claim 1 wherein said first chamber is contained within a substantially right circular cylinder over which said particulate solids matter overflows into said second chamber.

22. The process according to claim 21 wherein said second chamber is substantially defined by the annular area between said right circular cylinder defining said first chamber and a second outer right circular cylinder concentric with said first right circular cylinder.

23. The process according to claim 22 wherein the cross-sectional area of said second chamber in a horizontal plane is at least twice that of the first chamber.

24. The process according to claim 22 wherein said inlet leg is a right circular cylinder extending downwardly from said first zone into the lower regions of said first chamber.

25. The process according to claim 22 wherein said cooling in said second chamber is provided by extracting heat from the outside right circular cylinder wall defining said second chamber.

26. The process according to claim 1 wherein said flow restriction means is provided as a small diameter opening having a cross-sectional area transverse to the gas flow direction smaller than that in said second chamber by a factor of at least 100:1.

27. The process according to claim 26 wherein said small diameter opening is provided as an elongate conduit substantially extending from said second chamber to said second zone.

28. The process according to claim 1 wherein said flow restriction means is provided as a small diameter elongate conduit having a cross-sectional area transverse to the gas flow direction smaller than that in said second chamber by a factor of at least 100:1, said elongate conduit being situated inside a second elongate conduit of larger size to capture particulate solids which might leak from said small elongate conduit.

29. In a process for the production of aluminum chloride wherein chlorine and fluidized coked alumina particulate feedstock are reacted at temperatures between about 450° to 800° C. to form gaseous aluminum chloride and carbon oxide and wherein said alumina feedstock has an average particulate alpha alumina content of between about 0.05 and 4.5% by weight and wherein substantial portions of said alpha alumina are unreacted thereby tending to deplete volume otherwise available for chlorination reaction, the improvement wherein said unreacted particulate alpha alumina is semi-continuously removed from said process to restore said depleted reaction volume by the improved system comprising the steps of:
  (a) introducing said particulate alpha alumina into the upper portion of a downwardly extending substantially vertical inlet leg by fluidized particle transport;
  (b) moving said alumina downwardly within said inlet leg into the lower region of a first chamber separated from a second chamber by an overflow weir;
  (c) fluidizing said alumina particles within said first chamber by the action of a fluidizing gas introduced into the bottom portions of said first chamber and moving upwardly therethrough to move said fluidized alumina particles upwardly within said first chamber and overflow said weir to enter said second chamber;
  (d) fluidizing said alumina particles in said second chamber by the action of a fluidizing gas introduced into the bottom portions of said second chamber and moving upwardly therethrough, said particulate alumina within said second chamber mixing with and transferring heat by direct contact heat exchange to particulate alumina which previously entered said second chamber;
  (e) cooling said second chamber by indirect heat transfer means;
  (f) said first and second chambers being maintained at a pressure higher than that of said second zone;
  (g) maintaining said fluidizing gas in said second chamber at a higher overall gas volume flow ratio of at least 5:1;
  (h) moving said particulate alumina from said second chamber to said second zone at said lower pressure and temperature, said alumina particles being moved substantially by said fluidizing gas from said second chamber through a flow restricting means, said movement being regulated substantially by said flow restriction means in cooperation with said fluidizing gas from said second chamber flowing through said restriction means;
  (i) interrupting the flow of said particulate alumina into said first chamber by interrupting the flow thereof through said flow restriction means and substantially reducing the fluidizing gas flow into said second chamber while maintaining the fluidizing gas flow within said first chamber and into said inlet leg, said fluidizing gas passing upwardly into said first zone.

30. The process according to claim 29 wherein the rate of particulate solids movement through said flow restricting means is controlled by increasing flow of fluidizing gas to said second chamber to reduce particulate solids rate and decreasing said gas flow to increase said particulate solids rate.

31. In a process wherein a fluidizable particulate solids charge comprising reactive and nonreactive portions is semi-continuously fed to a reactor and the reactive portion thereof consumed by reaction with an active gas at temperatures of over 400° C. and at a given reaction pressure to produce a gaseous effluent and wherein said unreacted portion of said particulate charge remains in the reactor to deplete the same of reaction volume, the improved system for removing said unreacted particulate charge from said reactor to restore the depleted reaction volume and deliver the same to a collector at a substantially reduced temperature and pressure comprising the steps:
  (a) moving said unreacted particulate solids within said reactor to the entrance of a downwardly extending right circular cylindrical columnar inlet leg by fluidized particle transport utilizing an inactive fluidizing gas and moving said particulate solids downwardly within said columnar inlet leg into the lower region of a first chamber separated from a second chamber by a right circular cylindrical overflow weir;
  (b) fluidizing said particulate solids within said first chamber and said columnar inlet leg by the action of an inactive fluidizing gas introduced into the bottom portions of said first chamber and moving upwardly therethrough and through said leg to move said fluidized particles downwardly within said columnar leg and upwardly within said first chamber to overflow said weir and enter said second chamber;
  (c) fluidizing said particulate solids in said second chamber by the action of an inactive fluidizing gas introduced into the bottom portions of said second chamber and moving upwardly therethrough, said particulate solids within said second chamber mixing with and transferring heat by direct contact heat exchange to particulate solids which previously entered said second chamber;

(d) said second chamber occupying the annular space between said right circular cylinder defining said first chamber and a second right circular cylinder concentric with and larger than said first chamber cylinder, the annular cross-sectional area of said second chamber in a horizontal plane being at least twice that of the circular cross-sectional area of said first chamber in the same horizontal plane;

(e) cooling said second chamber by indirect heat transfer means applied through said larger right circular cylindrical wall;

(f) said first and second chambers being maintained at a pressure higher than that in said reactor;

(g) maintaining said fluidizing gas in said second chamber at a higher specific flow rate per unit cross-sectional area transverse to the gas flow than in said first chamber by a ratio of at least $1\frac{1}{2}$ times that in the first chamber and at an overall gas volume flow of at least 10 times that in said first chamber;

(h) moving said particulate solids from said second chamber to said collector at said lower pressure and temperature, said particles being moved substantially by said fluidizing gas from said second chamber through an elongate conduit flow restricting means, said movement being regulated substantially by said flow restriction means in cooperation with said fluidizing gas from said second chamber flowing through said restriction means;

(i) controlling the rate of particulate solids movement through said flow restricting means by increasing flow of fluidizing gas to said second chamber to reduce particulate solids rate and decreasing said gas flow to increase said particulate solids rate;

(j) interrupting the flow of said particulate matter into said first chamber by interrupting the flow thereof through said flow restriction means and substantially interrupting the fluidizing gas flow into said second chamber while maintaining the fluidizing gas flow within said first chamber and into said columnar inlet leg, said fluidizing gas from said first chamber passing upwardly through said inlet leg into said reactor;

(k) thereafter resuming the flow of said particulate solids by resuming the flow of fluidizing gas into said second chamber and removing the interruption to the flow through said flow restriction means.

* * * * *

UNITED STATES PATENT AND TRADEMARK OFFICE
CERTIFICATE OF CORRECTION

PATENT NO. : 4,301,138
DATED : November 17, 1981
INVENTOR(S) : Kenneth W. Ryan et al It is certified that error appears in the above–identified patent and that said Letters Patent are hereby corrected as shown below:

| | |
|---|---|
| Col. 2, line 64 | Change "50" to --60--. |
| Col. 6, line 3 | After "of" change "th" to --the--. |
| Col. 6, line 7 | Change "chamer" to --chamber--. |
| Col. 6, line 28 | Change "50" to --40--. |
| Col. 6, line 47 | Change "vlave" to --valve--. |
| Col. 8, line 1 | Change "of" to -- on --. |
| Claim 13, Col. 10, line 33 | Change "let" to --leg--. |

Signed and Sealed this

Second Day of February 1982

[SEAL]

Attest:

Attesting Officer

GERALD J. MOSSINGHOFF

Commissioner of Patents and Trademarks